(No Model.)
G. ROSS.
FLUID PRESSURE REGULATOR.
No. 285,163. Patented Sept. 18, 1883.
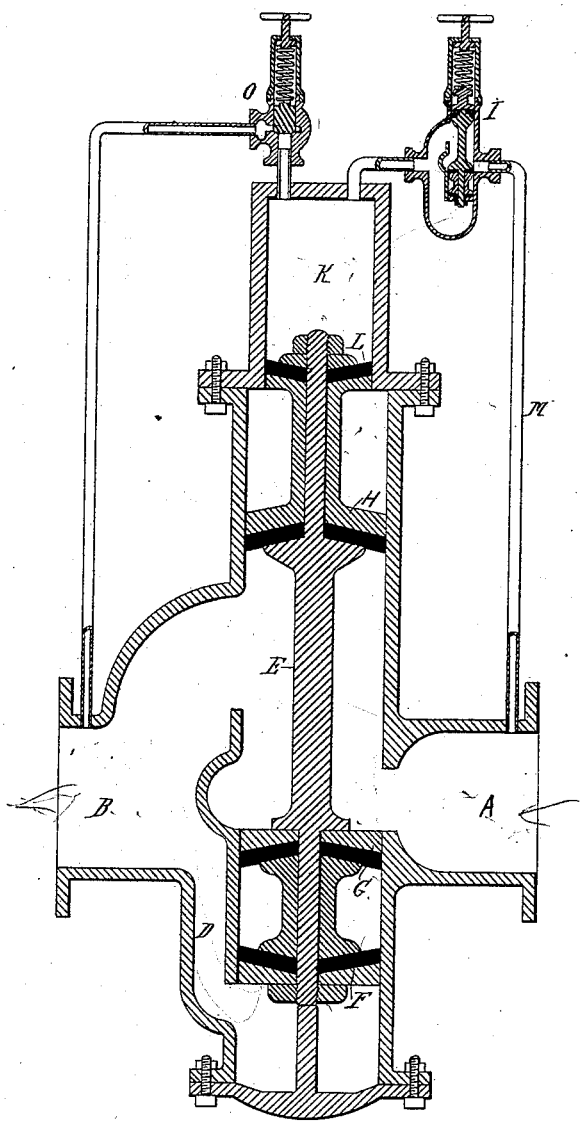

UNITED STATES PATENT OFFICE.

GEORGE ROSS, OF TROY, NEW YORK, ASSIGNOR TO THE ROSS VALVE COMPANY, OF SAME PLACE.

FLUID-PRESSURE REGULATOR.

SPECIFICATION forming part of Letters Patent No. 285,163, dated September 18, 1883.

Application filed February 12, 1883. (No model.)

*To all whom it may concern:*

Be it known that I, GEORGE ROSS, of Troy, county of Rensselaer, and State of New York, have invented certain new and useful Improvements in Fluid-Pressure Regulators, of which the following is a full, clear, and exact description, reference being had to the accompanying drawing, and to the letters of reference marked thereon.

My invention has relation to apparatus or means for regulating fluid or liquid pressure in pipes or mains and other situations, and particularly to that form of apparatus shown in my patent of September 2, 1879, No. 219,114, though the principles of operation of my present improvements might be applied in connection with other forms of pressure-regulators or pressure-reducers, as will be readily understood from the following explanations.

The object of my present invention is to produce a simple, accurate, and durable apparatus, which will be capable of receiving large volumes of fluid or liquids under high pressures and discharging the same at any required reduction of pressure with the same accuracy and facility as in cases of smaller volumes, dispensing with the metallic spring in connection with the main valves or pistons and substituting therefor a liquid or fluid under pressure, which may be regulated the same as the tension of the metallic spring has heretofore been regulated, and for like purposes and with like results, thus diminishing the cost of the apparatus and increasing its durability and range of pressures without in any way detracting from its efficiency.

To accomplish all of this my invention involves the application, in connection with the valve or pistons of the apparatus, of a fluid or liquid chamber, into which a fluid or liquid is introduced at a certain pressure, the same being made to accomplish the work of the metallic spring heretofore used for the purpose; and the invention further consists of certain new and useful arrangements or combinations of parts, principles of operation, and details of construction, all of which will be herein first fully described, and then pointed out in the claims.

In the accompanying drawing, forming part of this specification, I have shown a sectional elevation of an apparatus constructed and arranged to operate in accordance with my invention, and illustrating the principles thereof.

In this drawing, A is the inlet of the apparatus, through which water or steam or other liquid or fluid is received at any pressure and intended to be delivered at the outlet B at any reduced pressure, or pressure below that of the incoming liquid or fluid.

Within the main body of the apparatus are the connected pistons, (represented at F, G, and H,) the same being packed in any suitable way. The liquid or fluid flows around the connecting-stem E on its way to the outlet, producing a pressure on the under surface of H and an equal pressure on the upper surface of G, thus balancing these two pistons, as will be readily understood. Connected with or opening into the outlet-chamber is a channel, D, leading to the under side of piston F, and the pressure in this channel is always equal to that at the outlet. From this it will appear that any pressure on the under surface of F will elevate the two connected and balanced pistons G and H. The piston G is arranged so that when carried upwardly it will operate as a valve to cut off the incoming liquid or fluid. If, now, the balanced valves be held down by any pressure, this pressure will regulate the degree at which the fluid or liquid will be delivered from the apparatus, since it (the retaining-pressure) must be overcome by the back-pressure from the outlet, as when this back-pressure increases the valve G will instantly rise and cut off the inflow. This mode of operation so far is in all substantial respects the same as explained in my aforesaid patent, and is of course not novel in the present case.

In my former patent I employed a metallic spring for regulating the movement of the three pistons, as therein set forth. To dispense with this spring and substitute a liquid or fluid pressure in its stead, I connect a chamber, K, with the main apparatus, and in this chamber employ a packed piston, L, the same being connected with the other pistons by any suitable means, preferably and most simply by extending the spindle E, substantially as shown. The fluid or liquid in chamber K operates against the pressure on the under surface of F and tends to hold the valves down against the back-pressure. Of course, when the back-pressure is great enough to overcome the pressure on L, the valve G will rise and cut off the inflow to the apparatus. The fluid or liquid for K is derived from the main supply, which is intended to pass through the apparatus, and to indicate this I have shown the pipe or tube M as connected with the inlet-nozzle; but it might be led from any other convenient point in the delivery apparatus. To regulate the pressure in the chamber K, the pipe M, leading thereto, is supplied with a pressure-reducer, I, calculated to deliver the fluid or liquid through the pipe at any predetermined pressure. The valves or pistons in this subordinate reducer are governed by a spring, which may be set at any required tension. For the subordinate reducer I prefer to employ one constructed substantially as shown and in accordance with my aforesaid patent; but the principle of delivering a fluid or liquid at an automatically-regulated pressure into chamber K might be accomplished by use of any approved form of automatic pressure-reducer. As before explained, the pressure in chamber K must be overcome before the inflow to the main body of the apparatus can be cut off, so as to reduce the pressure at the outlet.

Connected with the chamber K is a relief-valve, (represented at O,) the same being of any approved pattern. This valve is set to rise from its seat at a pressure a trifle in excess of that at which the subordinate or auxiliary reducer I is set to deliver, so that when the pressure in outlet B exceeds the pressure on the relief-valve the latter will open and discharge the contents of chamber K into the outlet. That this discharging or overflowing may take place, the piston L, is in area somewhat less than the balanced piston G, so that while the large piston is balanced with respect to the inlet the pressure brought to bear on the piston L will determine the pressure in B and in the pipes beyond.

It is not necessary that the apparatus stand in the position shown. It will work in any position, and may be inverted, if desired.

The use of the fluid or liquid pressure to automatically control the movements of the valves or pistons in the reducer enables me to make the valves of any required size and still insure their effective working. The tension of a large metallic spring is difficult to adjust, and is not always permanent or regular, and, besides, the spring itself is often too expensive to warrant its use.

When constructed and arranged substantially in accordance with the foregoing explanations, the improved device is found in practice to admirably answer the purposes or objects of the invention, as previously set forth.

Having now fully described my invention, what I claim as new, and desire to secure by Letters Patent, is—

1. In an apparatus of the character herein set forth, the combination, with the stem carrying the balanced pistons arranged to be moved by the back-pressure from the outlet side of the apparatus, of a piston controlled by the pressure of a liquid or fluid conducted from the inlet branch to the piston-chamber through an auxiliary spring-actuated pressure-reducer, substantially as and for the purposes set forth.

2. In a pressure-reducer having the two balanced pistons arranged to be operated or moved by the back-pressure from the outlet side of the apparatus, the combination, with said pistons and their casings, of the fluid or liquid chamber, a piston made movable therein, a supply-pipe leading to said chamber from the inlet side, and a pressure-regulator or pressure-reducer applied on said supply-pipe, substantially as and for the purposes set forth.

3. In an apparatus of the character herein set forth, the combination, with the liquid or fluid chamber, of the piston mounted and made movable therein, the supply-pipe leading to said chamber, and having an auxiliary spring-actuated pressure-reducer applied thereon, and a relief-valve set and arranged to operate substantially as and for the purposes set forth.

4. In combination with the relief-valve applied upon the fluid or liquid chamber, a conduit leading therefrom to the outlet side of the apparatus, for the purpose of conducting the liquid or fluid, in the manner and for the purposes set forth.

In testimony that I claim the foregoing I have hereunto set my hand in the presence of two witnesses.

GEORGE ROSS.

Witnesses:
JOHN BUCKLER,
WORTH OSGOOD.